(12) United States Patent
Fang et al.

(10) Patent No.: US 9,963,167 B2
(45) Date of Patent: May 8, 2018

(54) INDUSTRIAL VEHICLE CAPABLE OF DRIVING IN FOUR DIRECTIONS AND TRAVELING MECHANISM FOR SUCH INDUSTRIAL VEHICLE

(71) Applicant: NOBLELIFT INTELLIGENT EQUIPMENT CO., LTD., Huzhou, Zhejiang (CN)

(72) Inventors: Yong Fang, Zhejiang (CN); Xuejun Zhou, Zhejiang (CN); Feiyu Peng, Zhejiang (CN); Haibo Jiang, Zhejiang (CN)

(73) Assignee: NOBLELIFT INTELLIGENT EQUIPMENT CO., LTD., Huzhou (CN)

( * ) Notice: Subject to any disclaimer, the term of this patent is extended or adjusted under 35 U.S.C. 154(b) by 0 days. days.

(21) Appl. No.: 15/114,968

(22) PCT Filed: Sep. 29, 2014

(86) PCT No.: PCT/CN2014/087732
§ 371 (c)(1),
(2) Date: Jul. 28, 2016

(87) PCT Pub. No.: WO2015/113406
PCT Pub. Date: Aug. 6, 2015

(65) Prior Publication Data
US 2016/0347363 A1    Dec. 1, 2016

(30) Foreign Application Priority Data

Jan. 28, 2014    (CN) .......................... 2014 1 0040648

(51) Int. Cl.
*B62D 9/00* (2006.01)
*B62D 7/02* (2006.01)
(Continued)

(52) U.S. Cl.
CPC ............... *B62D 9/00* (2013.01); *B62D 7/026* (2013.01); *B62D 7/1509* (2013.01); *B62D 61/10* (2013.01); *B66F 9/07568* (2013.01)

(58) Field of Classification Search
CPC .......... B62D 9/00; B62D 61/10; B62D 7/026; B62D 7/1509; B66F 9/07568;
(Continued)

(56) References Cited

U.S. PATENT DOCUMENTS 2,863,518 A * 12/1958 Pellizzetti ............ B62D 7/1509
180/236
3,067,839 A * 12/1962 Gibson ..................... B66F 9/10
180/253

(Continued)

FOREIGN PATENT DOCUMENTS

CN    2129282 Y  *  4/1993
CN    2288896 Y     8/1998
(Continued)

OTHER PUBLICATIONS

International Search Report of PCT Patent Application No. PCT/CN2014/087732 dated Jan. 8, 2015.

*Primary Examiner* — Laura Freedman

(57) ABSTRACT

The present disclosure discloses an industrial vehicle driving in four directions and a traveling mechanism for the industrial vehicle. The traveling mechanism for the industrial vehicle driving in four directions comprises four wheel sets at bottom of the vehicle body, the wheel sets are sequentially connected to form a quadrangle; one wheel set is a rotating wheel set, another wheel set is a reversible directional wheel set, and the axis direction of the rotating wheels is switched between two directions through the rotating action of a rotating shaft of the wheel set; the other two wheel sets are variable-state wheel sets, and the rotating wheel state are switched between a directional state and a follow-up uni- (Continued)

versal state. The present disclosure has simple structure, low cost, good supporting stability, and usage range, usage efficiency and maneuvering capability of the industrial vehicle are facilitated.

15 Claims, 17 Drawing Sheets

(51) Int. Cl.
 *B62D 7/15* (2006.01)
 *B66F 9/075* (2006.01)
 *B62D 61/10* (2006.01)

(58) Field of Classification Search
 CPC ............... B66F 9/07586; B66F 7/0625; B62B 2301/02; B62B 2301/04; B62B 2301/044; B62B 2301/046; B62B 2301/0465
 See application file for complete search history.

(56) References Cited

U.S. PATENT DOCUMENTS

| | | | | |
|---|---|---|---|---|
| 3,087,564 A | * | 4/1963 | Quayle | B62D 5/06 180/411 |
| 3,197,229 A | * | 7/1965 | Houlton | B66C 19/005 180/236 |
| 3,490,555 A | * | 1/1970 | Bautzen | B62D 7/02 180/403 |
| 3,998,288 A | * | 12/1976 | Aoki | B62D 7/02 180/211 |
| 4,446,941 A | * | 5/1984 | Laurich-Trost | B60K 17/10 180/236 |
| 4,778,024 A | * | 10/1988 | Matsumoto | B62D 1/28 180/167 |
| 4,823,899 A | * | 4/1989 | Ron | B62D 7/1509 180/236 |
| 5,295,554 A | * | 3/1994 | Cullen | A01F 25/14 180/236 |
| 5,335,739 A | * | 8/1994 | Pieterse | B62D 9/00 180/242 |
| 6,138,785 A | * | 10/2000 | Satoh | B60B 33/00 180/305 |
| 6,793,036 B1 | * | 9/2004 | Enmeiji | B62D 7/1509 180/411 |
| 6,854,552 B2 | * | 2/2005 | Yurushi | B66F 9/07568 180/234 |
| 6,866,113 B2 | * | 3/2005 | Sugata | B66F 9/07568 180/253 |
| 6,913,102 B2 | * | 7/2005 | Sugata | B60K 7/0007 180/236 |
| 7,252,299 B2 | * | 8/2007 | Wierzba | B62D 7/142 212/270 |
| 7,721,831 B2 | * | 5/2010 | Smolders | B62D 7/142 180/9.46 |
| 9,694,852 B2 | * | 7/2017 | Matsuoka | B60T 1/12 |
| 2004/0007415 A1 | * | 1/2004 | Kouyama | B66F 9/07568 180/411 |
| 2004/0238259 A1 | * | 12/2004 | Itoh | B62B 3/001 180/408 |
| 2016/0236710 A1 | * | 8/2016 | Ohba | F16H 19/04 |

FOREIGN PATENT DOCUMENTS

| | | | | |
|---|---|---|---|---|
| CN | 2410280 Y | * | 12/2000 | |
| CN | 1789105 A | | 6/2006 | |
| CN | 201670697 U | * | 12/2010 | |
| CN | 203063917 U | * | 7/2013 | |
| CN | 103287487 A | * | 9/2013 | |
| CN | 103496398 A | * | 1/2014 | |
| CN | 203698465 U | | 7/2014 | |
| DE | 2818480 A1 | * | 11/1979 | |
| DE | 10144372 A1 | * | 4/2003 | ............ B62B 3/001 |
| EP | 0143861 A1 | * | 6/1985 | |
| EP | 1008508 A2 | * | 6/2000 | ............ B60B 33/00 |
| GB | 2370259 A | * | 6/2002 | ............ A61G 5/042 |
| GB | 2395698 A | * | 6/2004 | ............ B62D 6/00 |
| JP | 52044915 A | * | 4/1977 | |
| JP | 55039846 A | * | 3/1980 | |
| JP | 57004471 A | * | 1/1982 | |
| JP | 60038271 A | * | 2/1985 | ............ B62D 9/00 |
| JP | 02258476 A | * | 10/1990 | |
| JP | 2004142494 A | * | 5/2004 | |
| JP | 2007030882 A | * | 2/2007 | ........ B60B 33/0039 |
| JP | 2010095141 A | * | 4/2010 | |
| JP | 2010247760 A | * | 11/2010 | |
| WO | WO-9530569 A1 | * | 11/1995 | ........ B60K 17/354 |

* cited by examiner

INDUSTRIAL VEHICLE CAPABLE OF DRIVING IN FOUR DIRECTIONS AND TRAVELING MECHANISM FOR SUCH INDUSTRIAL VEHICLE

BACKGROUND OF THE INVENTION

1. Technical Field

The present disclosure relates to industrial moving vans, and in particular, to an industrial vehicle capable of driving in four directions and a traveling mechanism for the industrial vehicle.

2. Description of Related Art

In the prior art, comprising common moving vans in which the straight forward direction is consistent with a length direction of fork and vertical side moving vans in which the straight forward direction is consistent with the length direction of fork.

A common moving van traveling mechanism as shown in FIG. 1, including a first fork 5, a first left front wheel 51, a first right front wheel 52, a first left rear wheel 53 and a first right rear wheel 54, wherein the first left rear wheel 53 is a driving wheel; the driving wheel is controlled by an operator to move forwards, backwards or steer; the two front wheels serve as guide wheels and are generally directional wheels; the first right rear wheel 54 is generally a follow-up universal wheel; the moving van can freely move forwards or backwards or turn; however, while turning in a narrow space, high operating difficulty is caused.

A side moving van traveling mechanism as shown in FIG. 2, including a second fork 6, a second left front wheel 61, a second right front wheel 62, a second left rear wheel 63 and a second right rear wheel 64, wherein the second right rear wheel 64 is a driving wheel; the driving wheel is controlled by an operator to move forwards, backwards or steer; the two front wheels serve as guide wheels and are generally directional wheels; the second left rear wheel 63 is generally a follow-up universal wheel; the moving van can freely move forwards or backwards or turn; however, while turning in a narrow space, high operating difficulty is caused.

In the technical field, the previous common moving van and side moving van cannot be effectively combined into a whole, although the existing improvement includes:

A four-wheel synchronous steering mechanism for an electric counterbalanced forklift disclosed by a utility model patent with the authorization publication number of CN2288896Y, including a motor used for driving a hydraulic oil pump, a hydraulic steering gear connected with the hydraulic oil pump through a pipeline, a chain wheel cylinder controlled by the hydraulic steering gear, and a steering chain driven by the chain wheel cylinder, wherein the steering chain drives a wheel-rotating shaft to realize four-wheel synchronous steering by virtue of the chain wheels which are respectively mounted on the wheel-rotating shaft; according to the traveling mechanism, theoretically the moving van can move straight forward to each direction under the condition that the vehicle body does not steer, so that the adaptive capacity of the moving van to the environment is improved; however, according to the four-wheel synchronous steering, the vehicle only can move straight forward and cannot turn; the moving van is complicated in structure and high in cost during direct manufacturing, and when a common moving van or side moving van is modified by transformation, the vehicle is wide in changing range, complicated in structure, high in cost and high in transformation difficulty.

A universal driving forklift disclosed by an invention patent application with the publication number of CN1789105A, comprising a frame, wherein the frame is connected with a front axle; the front axle is connected with a portal frame; the left and right front wheels are arranged at two ends of the front axle; left and right synchronous gear sets are fixed on the front axle; rear wheels are arranged at the rear end of the frame; rear rotating wheels are arranged on the rear wheels; an electromagnetic brake clutch is mounted in the middle of the frame; a left front wheel steering gear is fixed on the left front wheel; a right front wheel steering gear is fixed on the right front wheel and is connected with a lower gear of the right synchronous gear set; an upper gear of the right synchronous gear set is connected with an upper gear of the left synchronous gear set; an intermediate gear of the left synchronous gear set is connected with the left front wheel steering gear; a lower gear of the left synchronous gear set is connected with a lower gear of the electromagnetic brake clutch; an upper gear of the electromagnetic brake clutch is connected with the rear wheel steering gear; the traveling mechanism is of a three-supporting-point structure and adopts a steering mode of simultaneously steering three wheels; and therefore theoretically the moving van can move straight forward in each direction under the condition that the vehicle body does not steer, so that the adaptive capacity of the moving van to the environment is improved; although it is claimed that the vehicle can turn and has a relatively small turning radius, the axes of the two front wheels present two parallel lines which never intersect, actually the vehicle cannot realize turning where the wheel body does not produce sliding friction with the ground, namely real vehicle turning, under the condition that a spacing exists between the two front wheels; and moreover, the traveling mechanism is unstable to support; and when a common moving van or the side moving van is modified by transformation, the vehicle body is wide in changing range, complicated in structure, high in cost and high in transformation difficulty.

SUMMARY OF THE INVENTION

The present disclosure aims to disclose a traveling mechanism for an industrial vehicle capable of driving in four directions. The traveling mechanism is simple in structure and low in cost and has good supporting stability. According to the traveling mechanism, the industrial vehicle can realize the driving mode of a common moving van and the driving mode of a side moving van in the background, and conversion between the two driving modes can be conveniently realized. Meanwhile, the flexibility of the common moving van and the side moving van while turning is not reduced in the background, namely the turning radius is not increased, so that the application range of the industrial vehicle is widened, and the usage efficiency and maneuvering capability of the industrial vehicle are improved.

The technical purpose of the present disclosure is realized through the following technical schemes: a traveling mechanism for an industrial vehicle capable of driving in four directions includes four wheel sets arranged at the bottom of the vehicle body, wherein the wheel sets can be sequentially connected to form a quadrangle; one wheel set is a steering wheel set, another wheel set is a reversible directional wheel set, and the axle direction of the rotating wheels can be switched between two directions through the rotating action of a rotating shaft of the wheel set; the other two wheel sets are variable-state wheel sets, and the rotating wheel state can be switched between a directional state and a follow-up universal state.

According to the variable-state wheel sets, an included angle formed between the axle direction of the rotating wheel in one variable-state wheel set switched into a directional state and the axle direction of the rotating wheel in the other variable-state wheel set switched into a directional state and a rotatable angle of the rotating shaft of the reversible directional wheel set are mutually supplementary angles; particularly, when the previous included angle is 90 degrees, the rotatable angle of the rotating shaft of the reversible directional wheel set is 90 degrees.

As a preference of the present disclosure, the rotating wheel group and the reversible directional wheel set are positioned at one diagonal position of the quadrangle, and the two variable-state wheel sets are positioned at the other diagonal position of the quadrangle.

The rotating wheel group is generally a driving wheel group; so that the four wheel sets can be sequentially connected to form a quadrangle in that the four wheel sets are respectively positioned at four corners of the quadrangle; the four wheel sets are respectively a first wheel set, a second wheel set, a third wheel set and a fourth wheel set, the first wheel set and the third wheel set are positioned at one diagonal position of the quadrangle, the second wheel set and the fourth wheel set are positioned at the other diagonal position of the quadrangle, the fourth wheel set is a steering wheel set, in a wheel set distribution state, when the rotating wheel of the second wheel set is fixed at a position, the rotating wheel of the first wheel set is switched into a directional wheel state, the axle direction of the rotating wheel in the second wheel set coincides with or is parallel to the axle direction of the rotating wheel in the first wheel set, and then, the rotating wheel of the third wheel set is in a follow-up universal state; and when the rotating wheel in the second wheel set is fixed at a position forming an angle of approximately 90 degrees with the previous position, the rotating wheel in the third wheel set is switched into a directional wheel state, the axle direction of the rotating wheel in the second wheel set coincides with or is parallel to the axle direction of the rotating wheel in the third wheel set, and then, the rotating wheel of the first wheel set is in a follow-up universal state.

As a preference of the present disclosure, the traveling mechanism also includes a mode selection switch capable of switching the driving mode between a longitudinal driving mode and a transverse driving mode;

When the mode selection switch is selected as the longitudinal driving mode, the rotating wheels in one wheel set in the two variable-state wheel sets adjacent to the steering wheel set are switched into a directional state, while the rotating wheels in the other wheel set of the two wheel sets are switched into a follow-up universal state; and moreover, the axle direction of rotating wheels of the reversible directional wheel set diagonal to the steering wheel set is fixed at a position which coincides with or is parallel to the axle direction of the rotating wheels of the variable-state wheel set switched into the directional state;

When the mode selection switch is selected as the transverse driving mode, the rotating wheels positioned in the follow-up universal state in the two variable-state wheel sets adjacent to the steering wheel set are switched into a directional state, another rotating wheel positioned in a directional state is switched into a follow-up universal state, and rotating wheels in the reversible directional wheel set diagonal to the steering wheel set rotate so as to allow the axle direction of the rotating wheels to be fixed at a position which coincides with or is parallel to the axle direction of the rotating wheels switched into the directional state.

The longitudinal driving mode is a driving mode where the straight driving direction is parallel to or approximately parallel to a length direction of fork; and the transverse driving mode is a driving mode that a straight driving direction is perpendicular to or approximately perpendicular to a length direction of fork.

As a preference of the present disclosure, the variable-state wheel sets include rotating shafts driving the rotating wheels to steer, and limiting and positioning pieces capable of locking and loosening the rotating shafts to rotate and move.

As a preference of the present disclosure, the limiting and positioning pieces include moving parts, converting pieces which are connected between the moving parts and the rotating shafts and are used for converting the rotating motion of the rotating shafts around the axis thereof into a linear reciprocating motion of the moving parts, as well as positioning pieces capable of fixing the moving parts so as to limit the rotating motion of the rotating shafts.

As a preference of the present disclosure, each converting piece includes a linkage rod of which one end is rotationally connected to the moving part, and a rotating arm of which one end is fixedly connected to the rotating shaft and the other end is rotationally connected to the other end of the linkage rod; rotational connection of the rotating arm and the linkage rod is positioned on an axis deviating from the rotating shaft in the horizontal direction.

As a preference of the present disclosure, the rotating arm includes a working surface; the limiting and positioning piece also includes an auxiliary positioning piece; and when the rotating wheels in the corresponding variable-state wheel set are switched into a directional state, the auxiliary positioning piece includes a pressing surface pressing on the working surface, so that the rotating arm is fixed.

When the rotating wheels of the corresponding variable-state wheel sets are switched into the directional state, forced directions between the working surface and the pressing surface are intersected on the axis of the rotating shaft fixed with the rotating arm; under general conditions, due to the positioning pieces, the rotating arm can be fixed, however, the stability is low, particularly under the condition that the industrial vehicle has a large load, on one hand, when the follow-up universal state is switched into a directional state, the force of the positioning pieces is large, on the other hand, during the driving process, the force of the positioning pieces of the variable-state wheel sets positioned in the directional state is large, and in all likelihood when the industrial vehicle turns, due to the influence of frictional force stressed by the rotating wheel, the rotating arm will generate a rotating action; due to the auxiliary positioning pieces, the pressing surface is matched with the working surface, so that the directional state of the rotating wheels of the variable-state wheel sets can be further stabilized; and when the directional state needs to be switched into a follow-up directional state, the rotating arm is loosened by the auxiliary positioning pieces so as to facilitate free rotation of the rotating arm; and the positioning pieces and the auxiliary positioning pieces can be cylinders and other telescopic pieces.

As a preference of the present disclosure, the reversible directional wheel set includes a mounting plate, a rotating shaft capable of being rotationally supported on the mounting plate, a wheel stand which is fixedly arranged on the rotating shaft, a rotating wheel arranged on the wheel stand, and a steering piece used for driving the wheel stand to rotate.

The steering piece is controlled by the mode selection switch, so that the wheel stand rotates clockwise or anti-clockwise in the corresponding driving mode.

As a preference of the present disclosure, the steering wheel set is an electric driving wheel with an electric steering device.

As a preference of the present disclosure, the four wheel sets are respectively a first wheel set, a second wheel set, a third wheel set and a fourth wheel set, and the fourth wheel set is a steering wheel set; the first wheel set includes a first moving part, a first mounting plate, a first rotating shaft which can be rotationally connected to the first mounting plate and drives the rotating wheel of the first wheel set to steer, a first converting piece which is connected between the first moving part and the first rotating shaft and is used for converting the rotating motion of the first rotating shaft around the axis thereof into a linear reciprocating motion of the first moving part, as well as a first positioning piece capable of fixing the first moving part so as to limit the rotating motion of the first rotating shaft;

The second wheel set includes a second mounting plate, a second rotating shaft capable of being rotationally supported on the second mounting plate, a second wheel stand which is fixedly arranged on the second rotating shaft, a second rotating wheel arranged on the second wheel stand, and a second steering piece used for driving the second wheel stand to rotate by ±90 degrees;

The third wheel set includes a third moving part, a third mounting plate, a third rotating shaft which can be rotationally connected to the third mounting plate and drives the rotating wheel of the third wheel set to steer, a third converting piece which is connected between the third moving part and the third rotating shaft and is used for converting the rotating motion of the third rotating shaft around the axis thereof into a linear reciprocating motion of the third moving part, as well as a third positioning piece capable of fixing the third moving part so as to limit the rotating motion of the third rotating shaft.

As a preference of the present disclosure, the first converting piece includes a first linkage rod of which one end is rotationally connected to the first moving part, and a first rotating arm of which one end is fixedly connected to the first rotating shaft and the other end is rotationally connected to the other end of the first linkage rod; rotational connection of the first rotating arm and the first linkage rod is positioned on an axis deviating from the first rotating shaft in the horizontal direction.

As a preference of the present disclosure, the third converting piece includes a third linkage rod of which one end is rotationally connected to the third moving part, and a third rotating arm of which one end is fixedly connected to the third rotating shaft and the other end is rotationally connected to the other end of the third linkage rod; rotational connection of the third rotating arm and the third linkage rod is positioned on an axis deviating from the third rotating shaft in the horizontal direction.

The previous converting piece is simple in structure and easy to mount; certainly, the converting pieces also can be in other forms, for example, a gear meshed with the rotating shaft is arranged on the mounting plate, and a connecting rod which is rotationally connected with the moving part is rotationally connected to an eccentric position of the gear.

As a preference of the present disclosure, the first positioning piece is a first cylinder; and the first moving part is a piston rod of the first cylinder or another part.

As a preference of the present disclosure, the third positioning piece is a third cylinder; and the third moving part is a piston rod of the third cylinder or another part.

The previous other part is that the moving part is not just the piston rod of the cylinder. For example, the moving part can be a slide block, and the slide block can be fixedly connected to the piston rod and also can be not connected to the piston rod.

As a preference of the present disclosure, the first wheel set also includes movable first guide rails suitable for the first moving part.

As a preference of the present disclosure, two total first guide rails are symmetrically distributed along the movement track of the first moving part; and first grooves suitable to be connected with the first moving part in a sleeving manner are formed on opposite sides of the two first guide rails.

As a preference of the present disclosure, the third wheel set also includes movable third guide rails suitable for the third moving part.

As a preference of the present disclosure, two total third guide rails are symmetrically distributed along the movement track of the third moving part; and third grooves suitable to be connected with the third moving part in a sleeving manner are formed on opposite sides of the two third guide rails.

Another aim of the present disclosure is to disclose a traveling mechanism for an industrial vehicle capable of driving in four directions, including five wheel sets arranged at the bottom of the vehicle body, wherein one wheel set is a steering wheel set; another wheel set is a reversible directional wheel set, and the axle direction of the rotating wheels can be switched between two directions through the rotating action of a rotating shaft of the wheel set; another wheel set is a universal wheel set; and the other two are variable-state wheel sets, and the rotating wheel state can be switched between a directional state and a follow-up universal state; a reversible directional wheel set, wherein the two variable-state wheel sets are positioned on one diagonal of the quadrangle, the reversible directional wheel set and the universal wheel set are positioned on another diagonal of the quadrangle, and the steering wheel set is positioned on a central axis of the industrial vehicle positioned between two forks.

Another aim of the present disclosure is to disclose an industrial vehicle including any one of the previous technical schemes.

In conclusion, the present disclosure has the following beneficial effects: the present disclosure is simple in structure and easy to implement; the moving van applied to the present disclosure can be switched between the driving mode of a common moving van and the driving mode of a side moving van, although universal driving cannot be realized in patent documents provided by the background, while straight driving, driving parallel to or approximately parallel to a length direction of fork or driving perpendicular to or approximately perpendicular to a length direction of fork can be realized under the condition where the vehicle body does not steer, so that the adaptive capacity of the moving van to the driving environment is improved; and moreover, only three wheel sets except the steering wheel set are transformed in the present disclosure, the transformation structure is relatively independent, and necessary mechanical linkage is not needed among the three wheel sets, so that the transformation range is narrow, and change of the vehicle body is small. Therefore, the present disclosure is easy to implement, low in cost and simple and convenient to maintain. Moreover, the present disclosure is of a four-wheel supporting structure and is high in walking stability, and the driving mode is easy and rapid to switch by operating the mode selection switch; according to the rotating wheel of the first wheel set and the rotating wheel of the third wheel set, in order to allow the driving mode of the common moving van or the driving mode of the lateral moving van to be switched between the universal wheel and the directional wheel, turning of the vehicle body can be realized regardless of the driving mode, so that the driving stability is improved, and a relatively small turning radius can be kept.

In the figures, 1. first wheel set, 11. first mounting plate, 111. first sleeve hole, 1111. first supporting ring, 12. first rotating shaft, 13. first rotating wheel, 14. first moving part, 141. first roller, 15. first converting piece, 151. first linkage piece, 152. first rotating arm, 1521. working surface, 16. first positioning piece, 17. first guide rail, 171. first groove, 18. first wheel stand, 19. first axle, 191. first deep groove ball bearing, 192. first thrust ball bearing, 193. first washer, 2. second wheel set, 21. second mounting plate, 211. stopper, 22. second rotating shaft, 23. second wheel stand, 231. positioning block, 24. second rotating wheel, 25. second axle, 26. steering piece, 3. third wheel set, 31. third mounting plate, 311. third sleeve hole, 3111. third supporting ring, 32. third rotating shaft, 33. third rotating wheel, 34. third moving part, 341. third roller, 35. third converting piece, 351. third linkage piece, 352. third rotating arm, 36. third positioning piece, 37. third guide rail, 371. third groove, 38. third wheel stand, 39. third axle, 391. third deep groove ball bearing, 392. third thrust ball bearing, 393. third washer, 4. fourth wheel set, 5. first fork, 51. first left front wheel, 52. first right front wheel, 53. first left rear wheel, 54. first right rear wheel, 6. second fork, 61. second left front wheel, 62. second right front wheel, 63. second left rear wheel, 64. second right rear wheel, 71. auxiliary positioning piece, 711. pressing surface, 81. reversible directional wheel set, 82. universal wheel set, 831. first variable-state wheel set, 832. second variable-state wheel set, 84. steering wheel set.

DETAILED DESCRIPTION OF THE INVENTION

The present disclosure is further described in detail by combining the drawings in the following:

The specific embodiment is only a description of the present disclosure, not a limitation to the present disclosure. A person skilled in the art can make modification without creative contribution to the embodiment after reading the specification, however, the present disclosure is protected by patent law in the scope of claims.

A driving mode of driving along the length direction of fork or approximately along the length direction of fork is defined as the longitudinal driving mode; and the driving mode of driving along a direction perpendicular to or approximately perpendicular to the length direction of fork is defined as the transverse driving mode.

Figure 1:
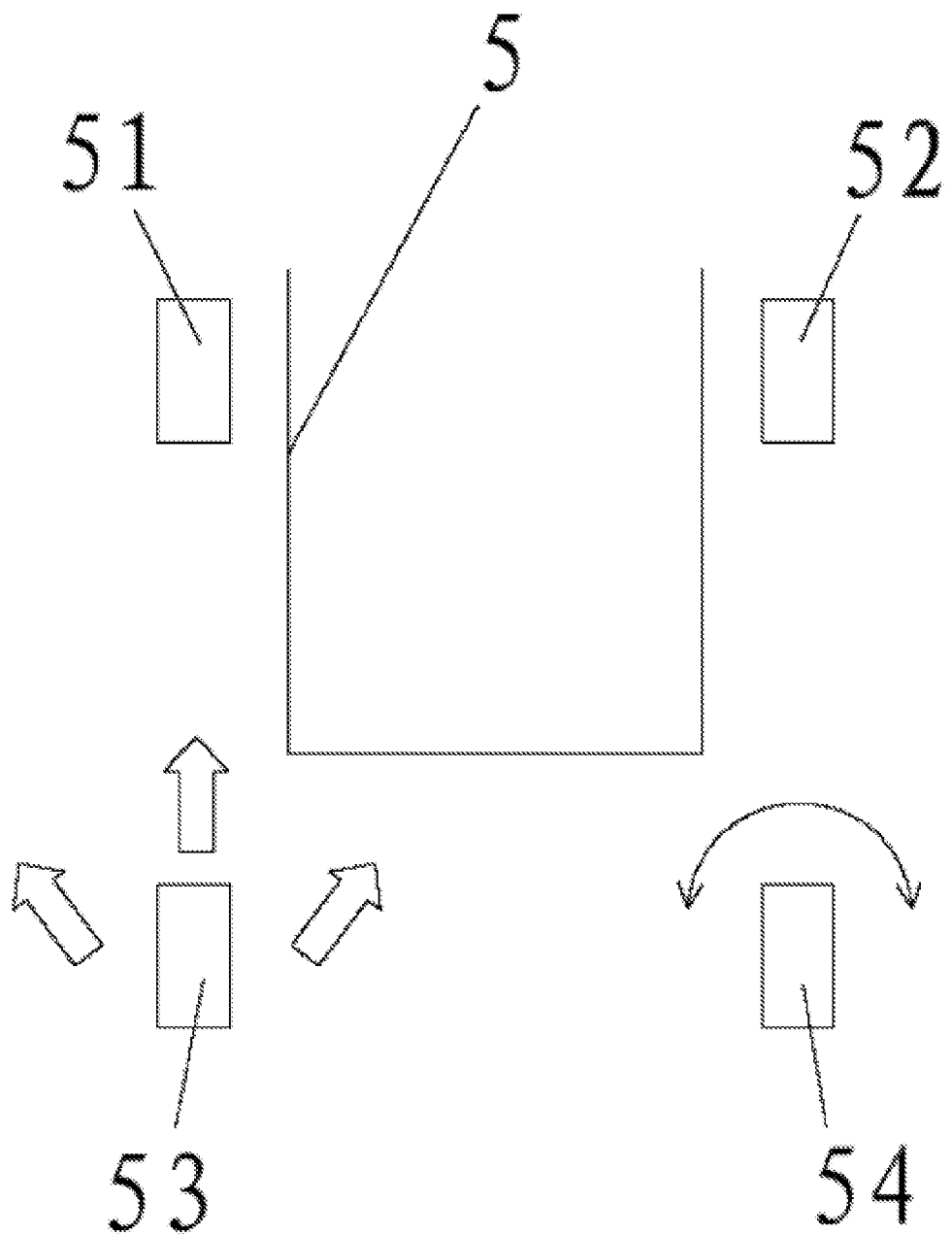
FIG. 1 shows the schematic diagram of a common moving van traveling mechanism in the background.
Figure 2:
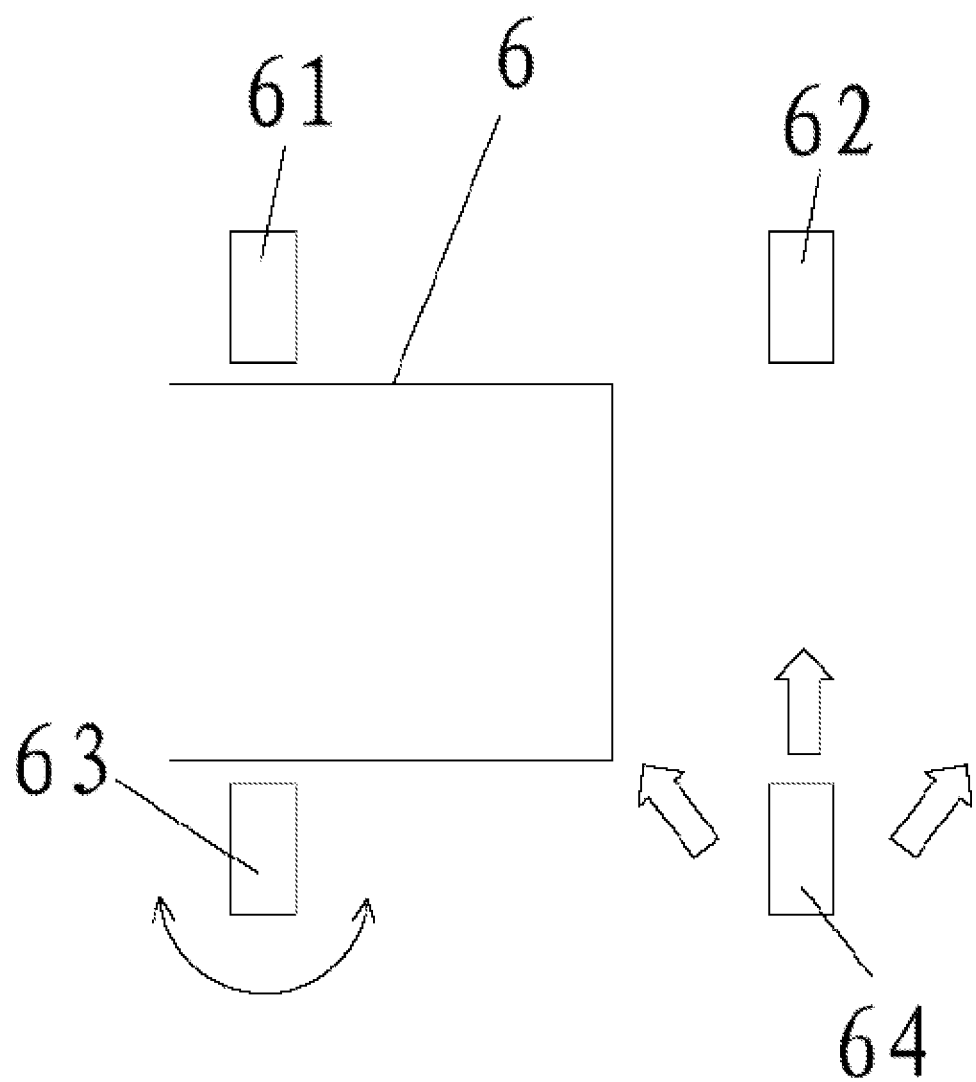
FIG. 2 shows the schematic diagram of a side moving van traveling mechanism in the background.
Figure 3:
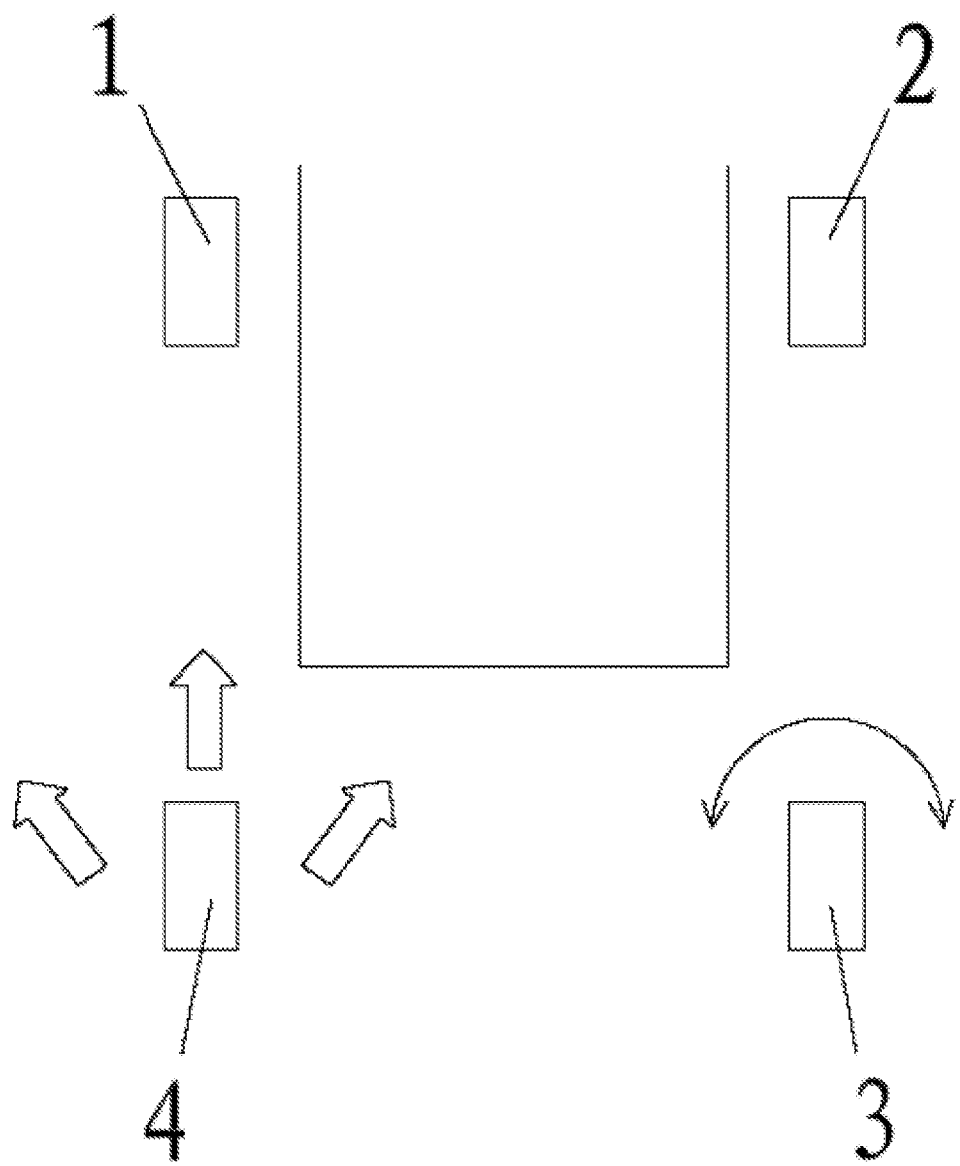
FIG. 3 shows the schematic diagram of wheel set distribution in the Embodiment 1.

Embodiment 1: as shown in FIG. 3, a traveling mechanism for an industrial vehicle capable of driving in four directions, comprising four wheel sets which are respectively arranged at four different positions of the vehicle body so as to form a quadrangle, wherein the quadrangle is generally a rectangle.

Figure 4:
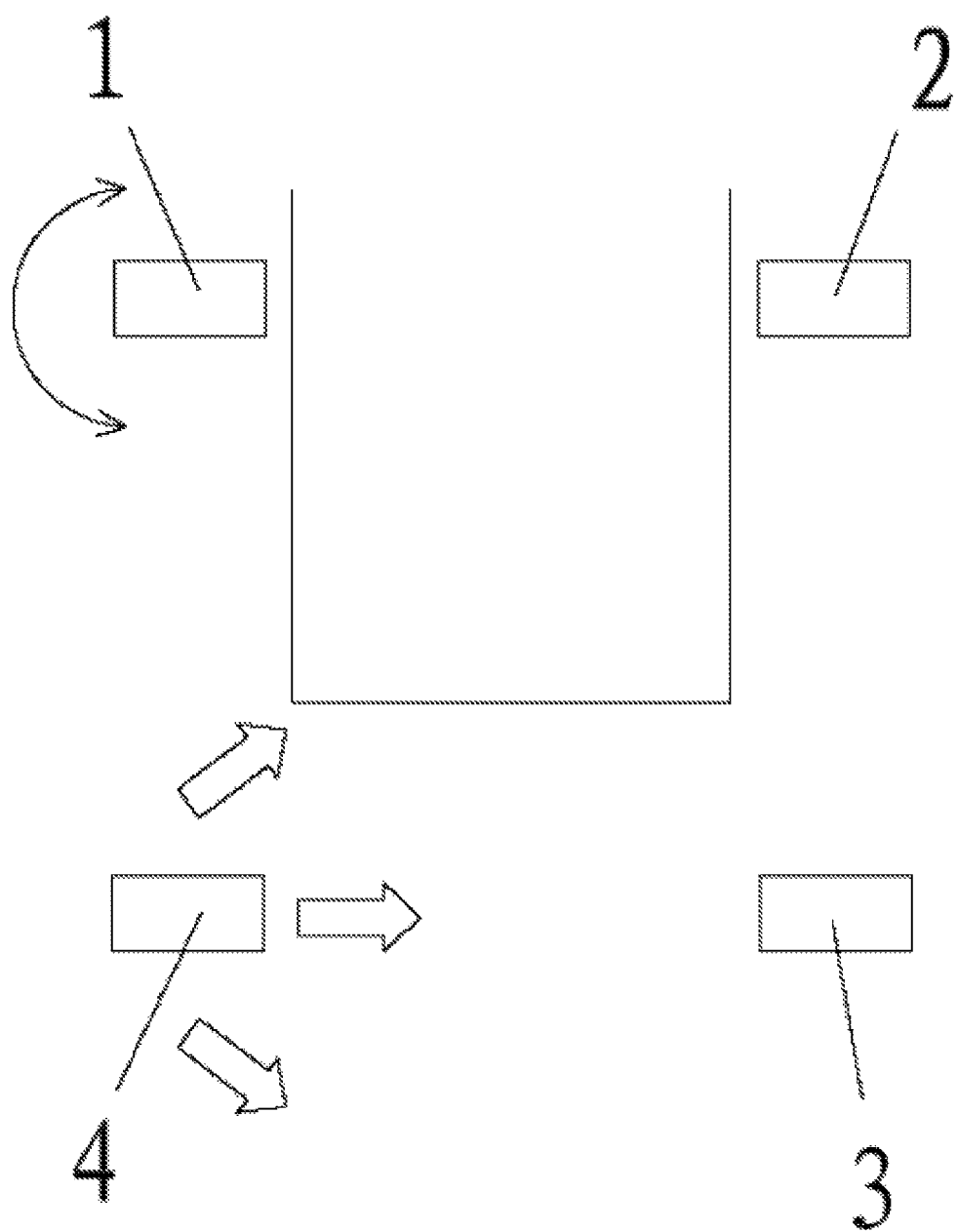
FIG. 4 shows the schematic diagram of a transverse driving mode in the Embodiment 1.

The four wheel sets are respectively a first wheel set 1, a second wheel set 2, a third wheel set 3 and a fourth wheel set 4, wherein the first wheel set 1 and the third wheel set 3 are respectively positioned at one diagonal position of the quadrangle; the second wheel set 2 and the fourth wheel set 4 are respectively positioned at the other diagonal position of the quadrangle; wherein the fourth wheel set 4 is a steering wheel set of which the steering angle is controlled by a steering mechanism and is also a driving wheel set, and the steering mechanism is generally an electric steering device and can steer along with operation of an operator; the second wheel set 2 is always a directional wheel and can steer by 90 degrees so as to adapt to different driving modes; the first wheel set 1 and the third wheel set can be switched between the universal wheel and the directional wheel; in the longitudinal driving mode, as shown in FIG. 3, the first wheel set 1 is a directional wheel, and the third wheel set 3 is a universal wheel, so that the vehicle can freely turn to drive in the driving mode; in the transverse driving mode, as shown in FIG. 4, the first wheel set 1 is a universal wheel, and the third wheel set 3 is a directional wheel, so that the vehicle can freely turn to drive in the driving mode. As used herein, the terms "first", "second", "third", etc. are not only used to show a serial or numerical limitation but are also used to distinguish or identify various features of the traveling mechanism.

Figure 5:
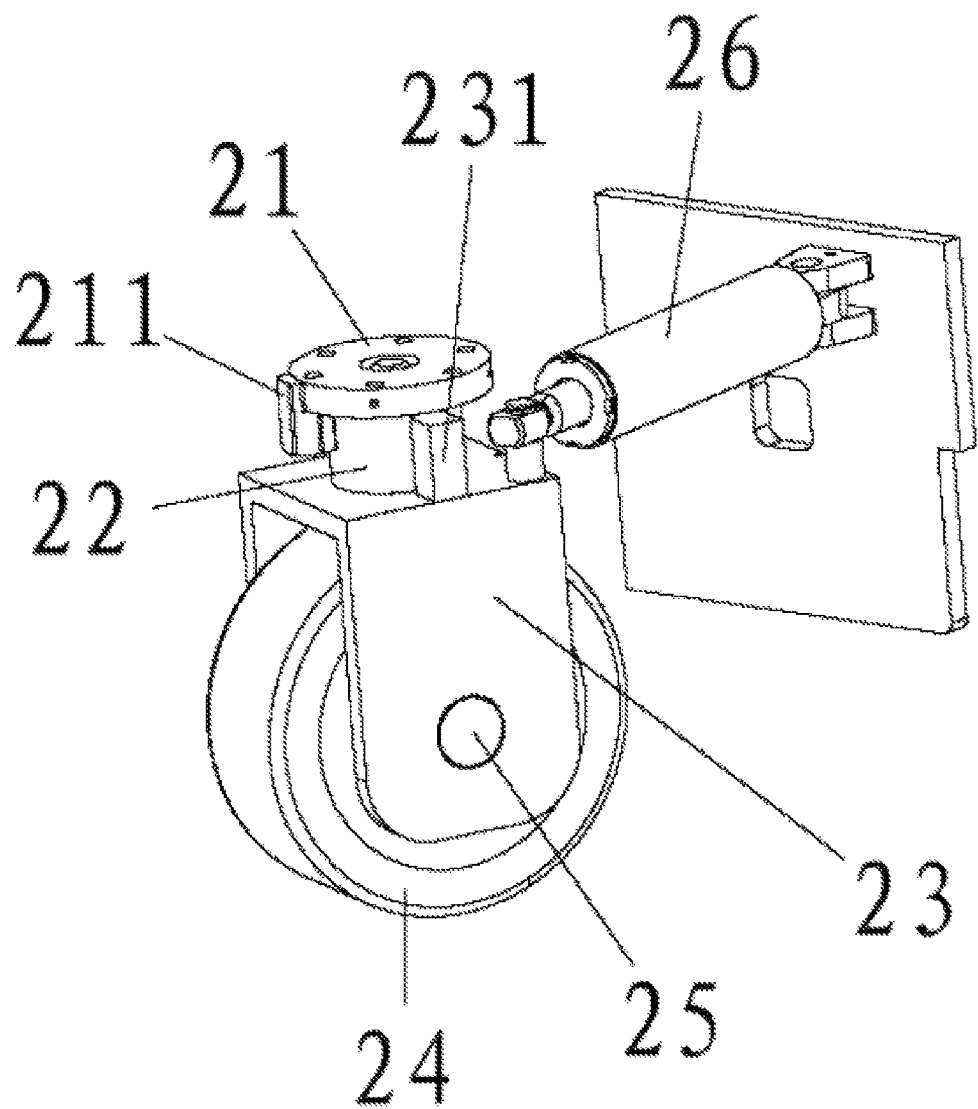
FIG. 5 shows the structure diagram of a second wheel set in the Embodiment 1.
Figure 6:
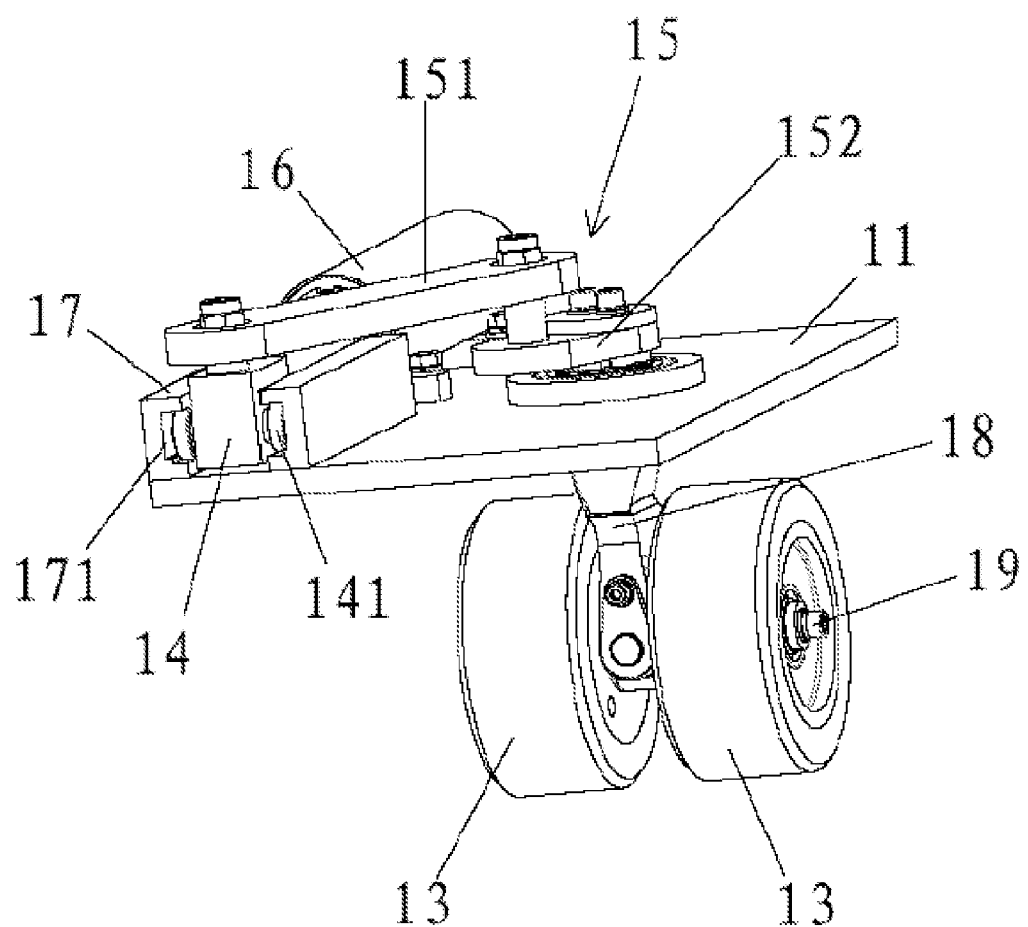
FIG. 6 shows the structure diagram of a first wheel set in the Embodiment 1.
Figure 7:
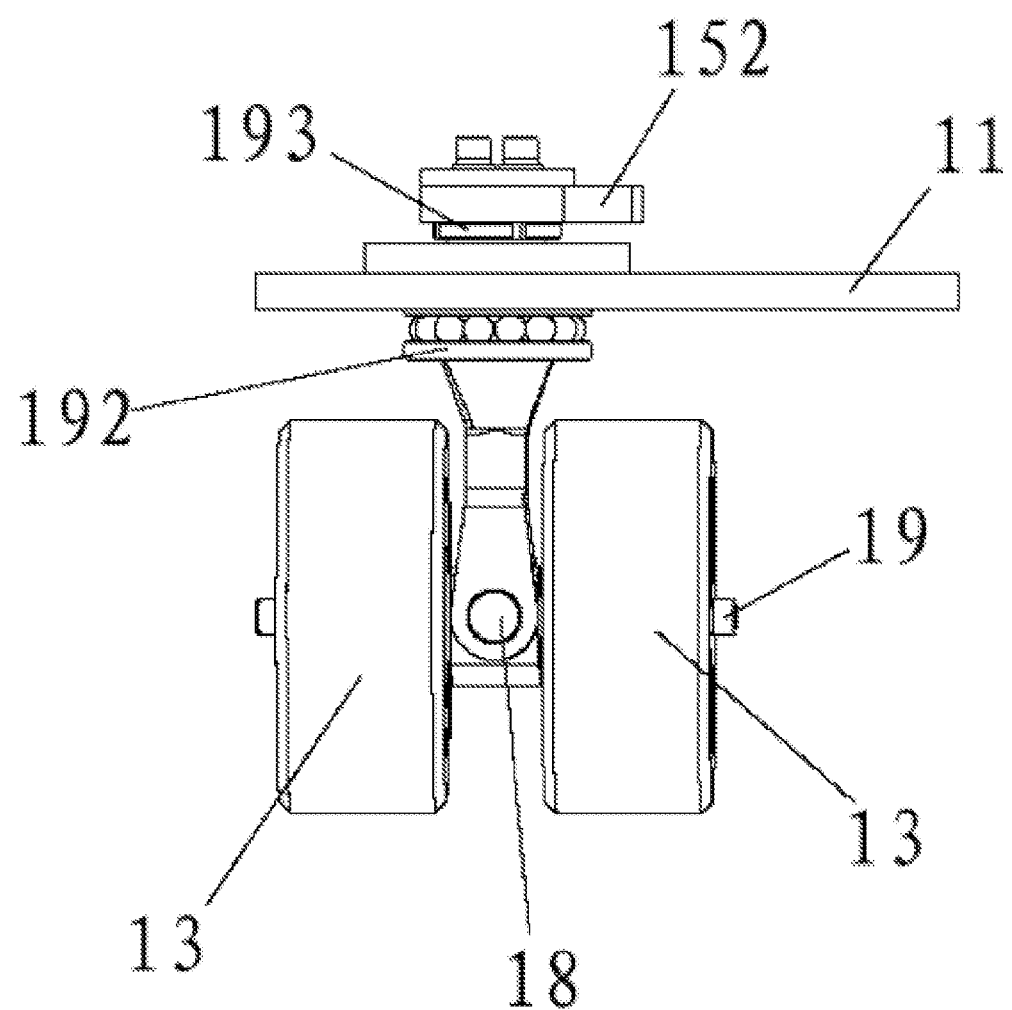
FIG. 7 shows the side view of the first wheel set in the Embodiment 1.
Figure 8:
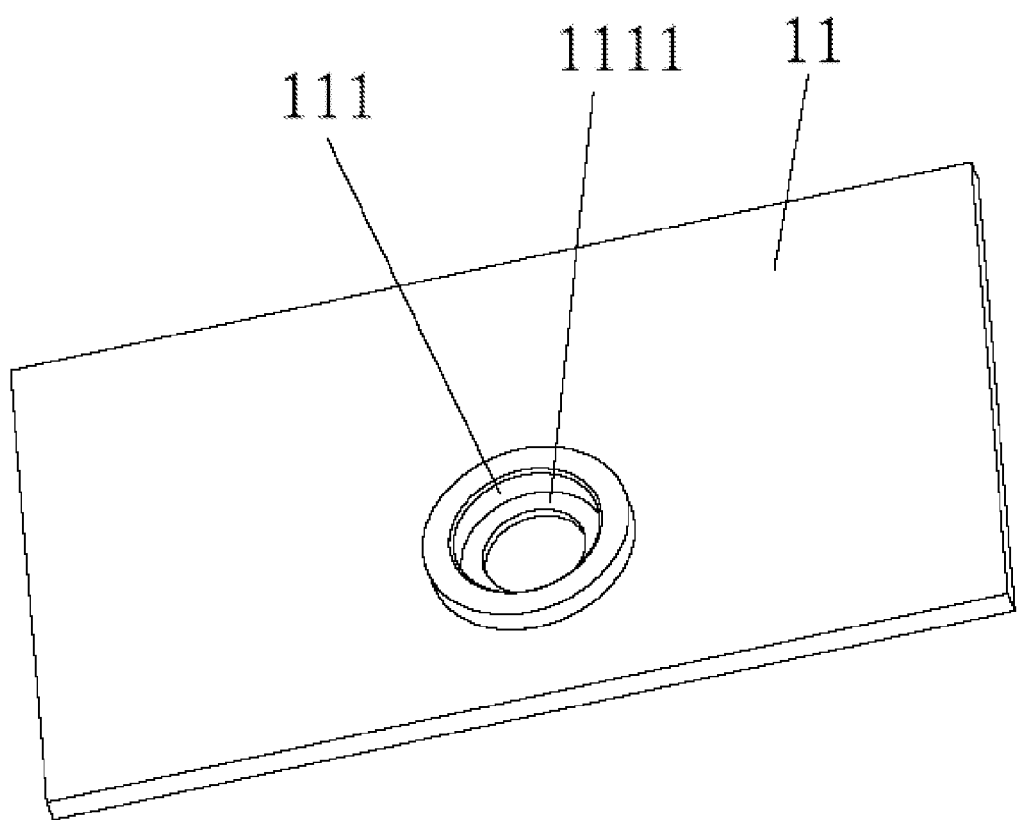
FIG. 8 shows the structure diagram of a mounting plate I in the Embodiment 1.
Figure 9:
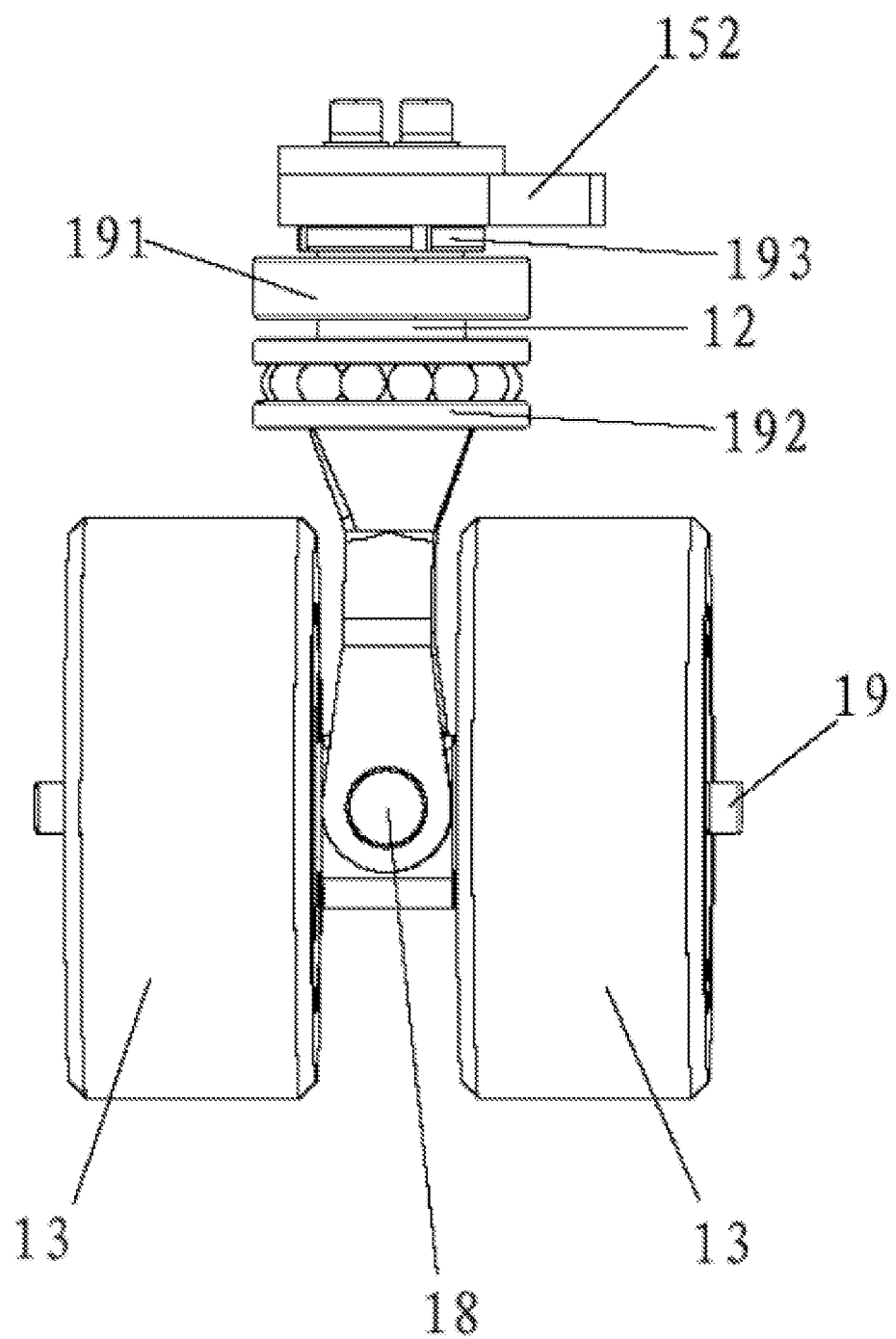
FIG. 9 shows the side view of the first wheel set in the Embodiment 1, compared with FIG. 7, without the first mounting plate.
Figure 10:
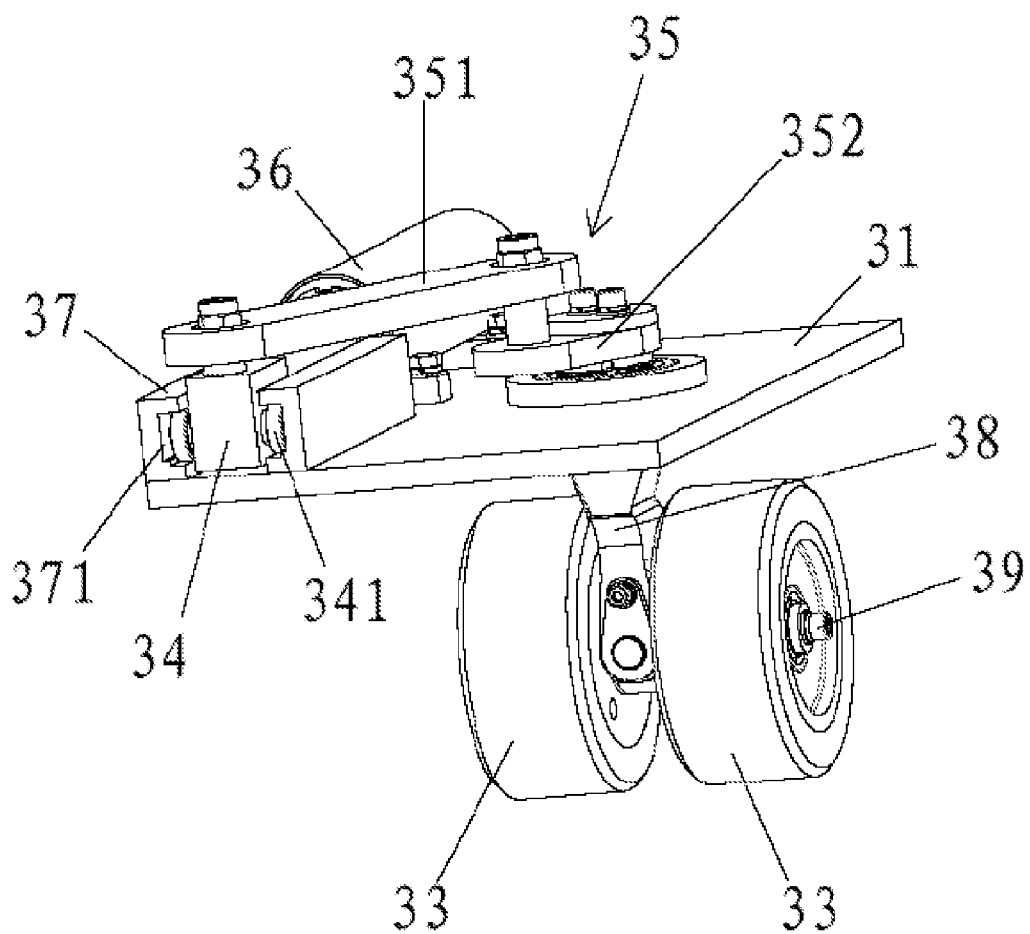
FIG. 10 shows the structure diagram of a third wheel set in the Embodiment 1.
Figure 11:
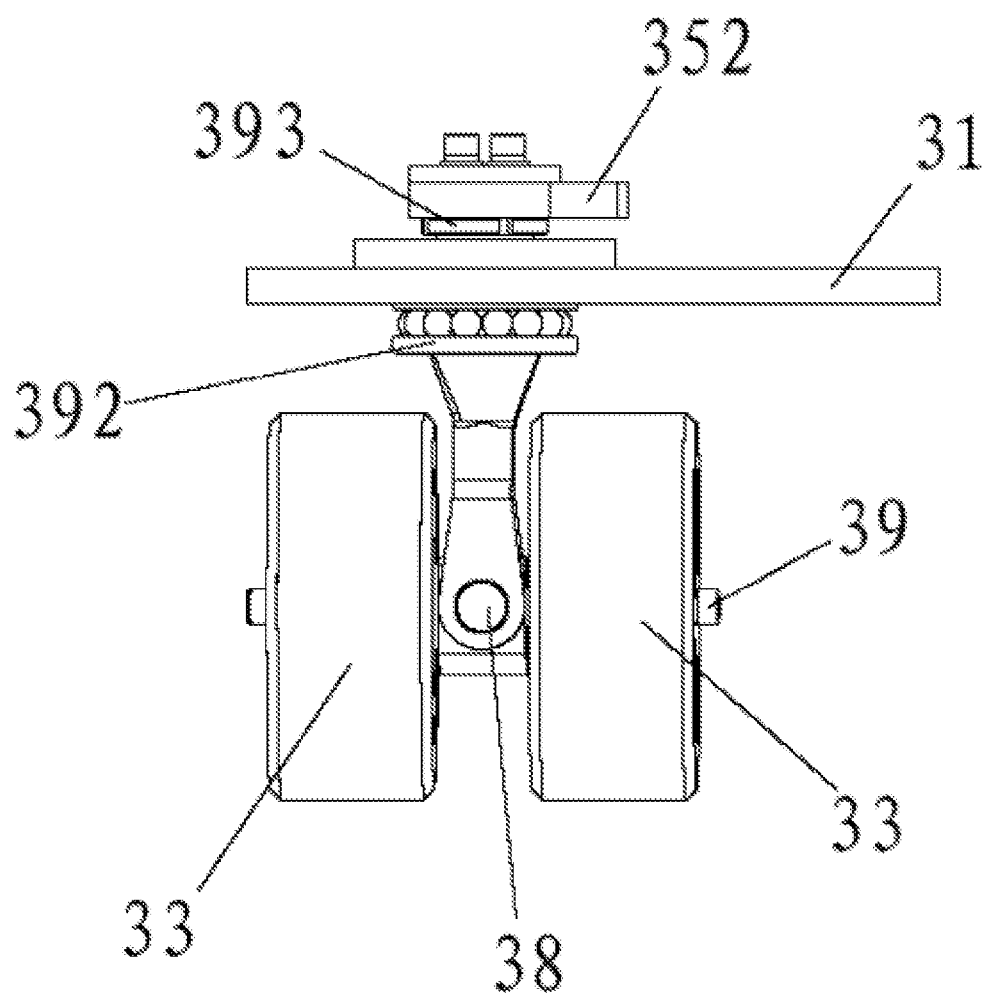
FIG. 11 shows the side view of the third wheel set in the Embodiment 1.
Figure 12:
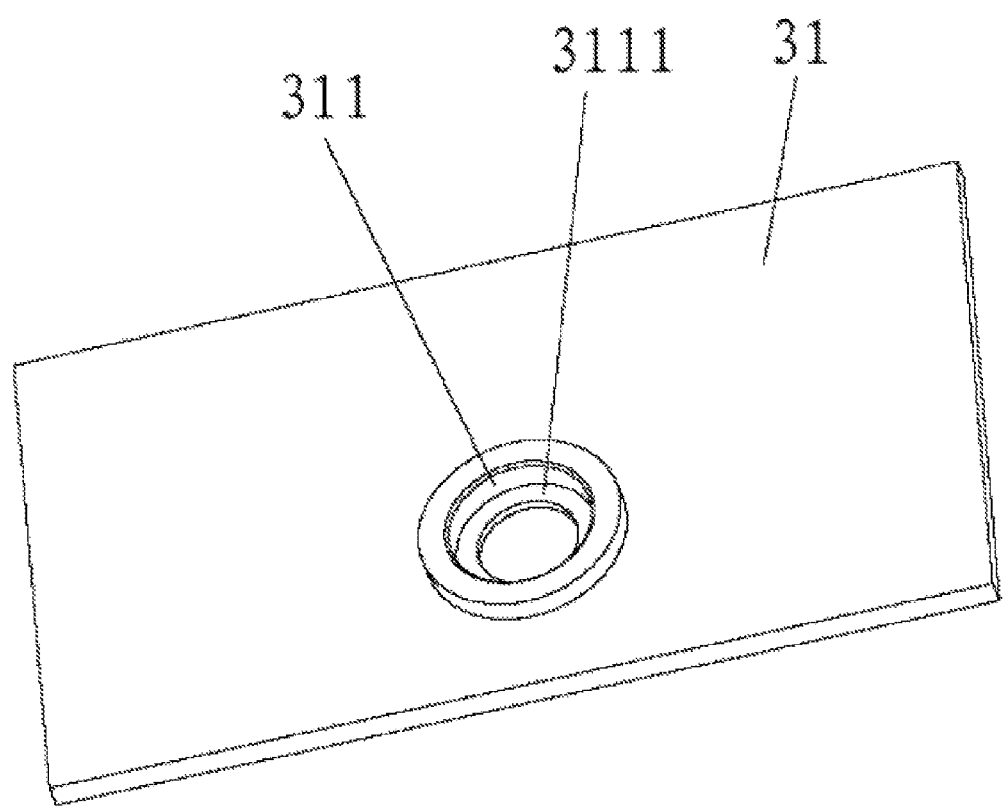
FIG. 12 shows the structure diagram of a third mounting plate in the Embodiment 1.
Figure 13:
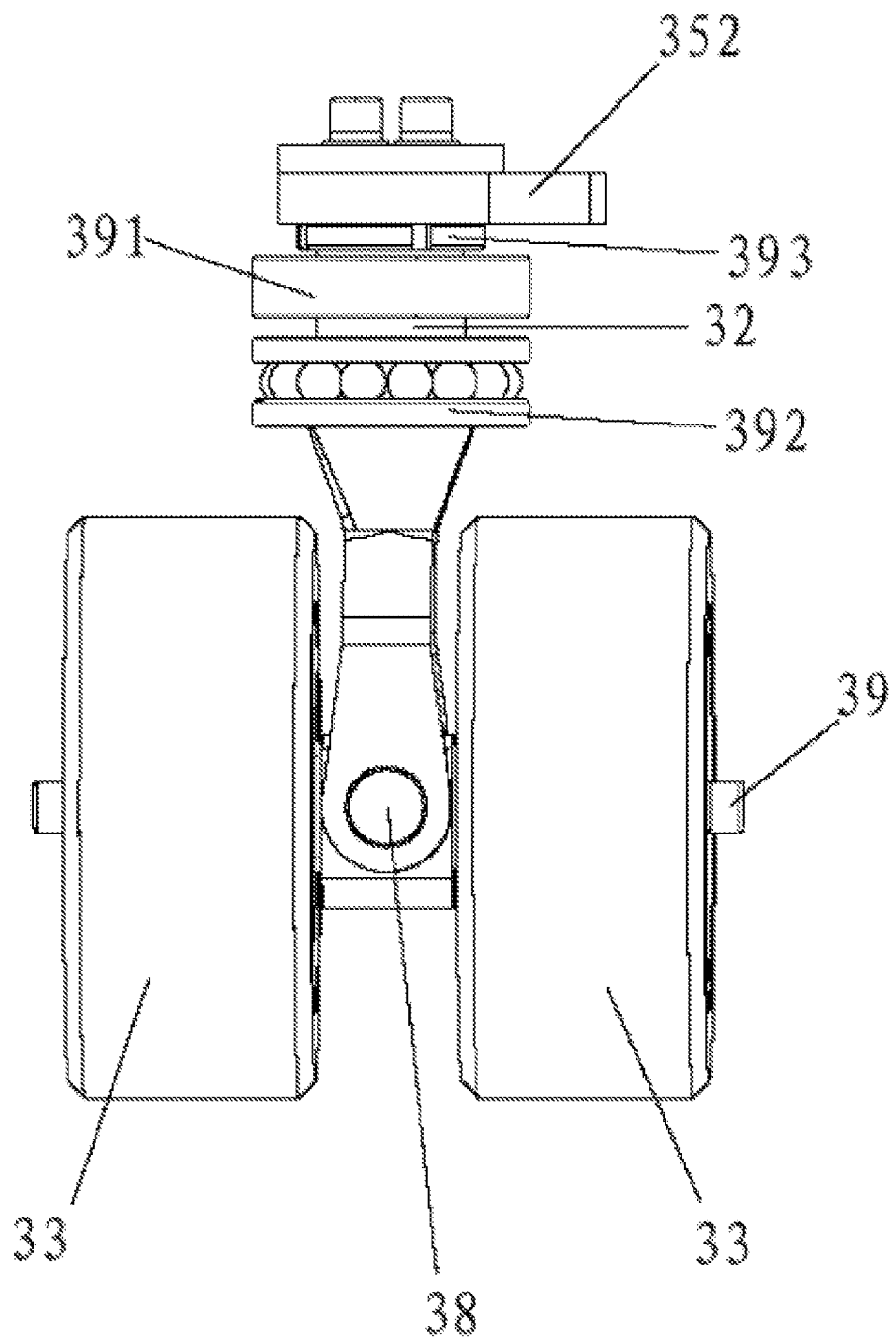
FIG. 13 shows the side view of the third wheel set in the Embodiment 1, compared with FIG. 11, without the third mounting plate.

As shown in FIG. 5, the second wheel set 2 includes a second mounting plate 21, a second rotating shaft 22 is rotationally connected to the second mounting plate 21; a wheel stand 23 is fixedly connected to the lower end of the second rotating shaft 22; a second axle 25 is mounted between two sides of the wheel stand 23; a second rotating wheel 24 is arranged on the second axle 25; the second wheel set 2 also includes a steering piece 26 used for realizing 90-degree steering of the second rotating wheel 24; the steering piece 26 in the embodiment is a second cylinder arranged between the body of the moving van and the wheel stand 23, a cylinder barrel of the second cylinder is connected to the body, a piston rod is rotationally connected to the wheel stand 23 and is eccentrically connected to the wheel stand 23, and due to telescopic motion of the second cylinder, the wheel stand 23 is driven to rotate so as to realize 90-degree steering; including a directional wheel state of the second wheel set 2 when the piston rod retracts to a position at which the piston rod cannot retract anymore; a stopper 211 is arranged on the second mounting plate 21, a positioning block 231 is arranged on the wheel stand 23, and when the piston rod extends out until the positioning block 231 is pressed against the stopper 211, and the positioning block 231 and the stopper 211 are always kept in a pressing state, another directional wheel state of the second wheel set 2 is formed; certainly, the stopper and the positioning block can be avoided, for example, two telescopic extreme states of the piston rod are determined as two directional states of the second wheel set 2.

As shown in FIG. 6-9, the first wheel set 1 includes a first rotating shaft 12, wherein a first wheel stand 18 is fixedly connected to the lower end of the first rotating shaft 12; a first axle 19 is connected to the lower part of the first wheel stand 18; and first rotating wheels 13 are respectively arranged on two sides of the first axle 19.

A first sleeve hole 111 is formed in the first mounting plate 11, and a first supporting ring 1111 is arranged on the inner wall of the first sleeve hole 111, so that the first sleeve hole 111 is divided into two longitudinally distributed parts; a first deep groove ball bearing 191 is arranged on the upper part of the first sleeve hole 111, namely above the first supporting ring 1111; a first rotating shaft 12 is positioned below the first mounting plate 11 and includes a supporting end; and a first thrust ball bearing 192 is arranged between the supporting end and the supporting ring 1111.

A first moving part 14, a first converting piece 15 which is connected between the first moving part 14 and a first rotating shaft 12 and is used for converting the rotating motion of the first rotating shaft 12 around the axis thereof into a linear reciprocating motion of the first moving part 14, and a first positioning piece 16 capable of fixing the first moving part 14 so as to limit the rotating motion of the first rotating shaft 12 are arranged on the first mounting plate 11.

The first converting piece 15 includes a first linkage rod 151 of which one end is rotationally connected to the first moving part 14, and a first rotating arm 152 of which one end is fixedly connected to the first rotating shaft 12 and the other end is rotationally connected to the other end of the first linkage rod 151; rotational connection of the first rotating arm 152 and the first linkage rod 151 is positioned on an axis deviating from the first rotating shaft 12 in the horizontal direction; the first rotating arm 152 can be fastened to the first rotating shaft 12 by screws in a manner of screwing into the first rotating shaft 12 from top to bottom, and a first washer 193 sleeved to the first rotating shaft 12 can be arranged between the first rotating arm 152 and an inner ring of the first deep groove ball bearing 191, so that the first thrust ball bearing 192 is pressed between the supporting end and the supporting ring 1111 under the action of the screws, and the first washer 193, the inner ring of the first deep groove ball bearing 191 and the first rotating arm 152 can be axially fastened.

The first positioning piece 16 is a first cylinder; the first moving part 14 is a first slide block, and two first guide rails 17 which are symmetrically distributed along the movement track of the first moving part 14 are arranged on the mounting plate 11; first grooves 171 are respectively formed on opposite sides of the two first guide rails 17; and first rollers 141 positioned in the first grooves 171 in a sleeving manner are arranged on two sides of the first slide block.

When the first cylinder does not work, the first slide block linearly reciprocates along the first guide rail 17 under the action of the first rotating shaft 12, then the first wheel set 1 is a universal wheel; when the first cylinder works, the piston rod continuously extends out until the first rotating arm 152 and the linkage rod 151 form a straight line, and the piston rod is always kept in the state, so that the first slide block cannot move, the first rotating shaft 12 also cannot rotate due to the action of the first slide block; and therefore, the first wheel set 1 is converted from the universal wheel to the directional wheel.

Certainly, the first positioning rod 16 is not only limited to a cylinder, it can also be a motor. For example, the rotating motion of a motor output shaft is converted into the linear motion of another piece, so that the first moving part 14 can be fastened or loosened.

The first moving part 14 is also not only a first slide block, and when the first positioning piece 16 is a first cylinder, the first moving part 14 can be a piston rod of the first cylinder.

The first converting piece 15 is also not only the previous setting; for example, that is, a gear meshed with the first rotating shaft 12 is arranged on the mounting plate 11, and a connecting rod which is rotationally connected to the first moving part 14 is rotationally connected to an eccentric position of the gear.

As shown in FIG. 10-13, the third wheel set 3 includes a third rotating shaft 32, wherein a third wheel stand 38 is fixedly connected to the lower end of the third rotating shaft 32; a third axle 39 is connected to the lower part of the third wheel stand 38; and third rotating wheels 33 are respectively arranged on two sides of the third axle 39.

A third sleeve hole 311 is formed in the third mounting plate 31, and a third supporting ring 3111 is arranged on the inner wall of the third sleeve hole 311, so that the third sleeve hole 311 is divided into two longitudinally distributed parts; a third deep groove ball bearing 391 is arranged on the upper part of the third sleeve hole 311, namely above the third supporting ring 3111; a third rotating shaft 32 is positioned below the third mounting plate 31 and includes a supporting end; and a third thrust ball bearing 392 is arranged between the supporting end and the supporting ring 3111.

A third moving part 34, a third converting piece 35 which is connected between the third moving part 34 and the third rotating shaft 32 and is used for converting the rotating motion of the third rotating shaft 32 around the axis thereof into a linear reciprocating motion of the third moving part 34, and a third positioning piece capable of fixing the third moving part 34 so as to limit the rotating motion of the third rotating shaft 32 are arranged on the third mounting plate 31.

The third converting piece 35 includes a third linkage rod 351 of which one end is rotationally connected to the third moving part 34, and a third rotating arm 352 of which one end is fixedly connected to the third rotating shaft 32 and the other end is rotationally connected to the other end of the third linkage rod 351; rotational connection of the third rotating arm 352 and the third linkage rod 351 is positioned on an axis deviating from the third rotating shaft 32 in the horizontal direction; the third rotating arm 352 can be fastened to the third rotating shaft 32 by screws in a manner of screwing into the third rotating shaft 32 from top to bottom, and a third washer 393 sleeved to the third rotating shaft 32 can be arranged between the third rotating arm 352 and an inner ring of the third deep groove ball bearing 391, so that the third thrust ball bearing 392 is pressed between the supporting end and the supporting ring 3111 under the action of the screws, and the third washer 393, the inner ring of the third deep groove ball bearing 391 and the third rotating arm 352 can be axially fastened.

The third positioning piece 36 is a third cylinder; the third moving part 34 is a third slide block, and two third guide rails 37 which are symmetrically distributed along the movement track of the third moving part 34 are arranged on the mounting plate 31; third grooves 371 are respectively formed on opposite sides of the two third guide rails 37; and third rollers 341 positioned in the third grooves 371 in a sleeving manner are arranged on two sides of the third slide block.

When the third cylinder does not work, the third slide block linearly reciprocates along the third guide rail 37 under the action of the third rotating shaft 32, then the third wheel set 3 is a universal wheel; when the third cylinder works, the piston rod continuously extends out until the third rotating arm 352 and the linkage rod 351 form three straight lines, and the third piston rod is always kept in the state, so that the third slide block cannot move, the third rotating shaft 32 also cannot rotate due to the action of the third slide block; and therefore, the third wheel set 3 is converted from the universal wheel to the directional wheel.

Certainly, the third positioning rod 36 is not only limited to a cylinder, it can also be a motor. For example, the rotating motion of a motor output shaft is converted into the linear motion of another three pieces, so that the third moving part 34 can be fastened or loosened The third moving part 34 is also not only a third slide block, and when the third positioning piece 36 is a third cylinder, the third moving part 34 can be a piston rod of the third cylinder.

The third converting piece 35 is also not only the previous setting; for example, that is, a gear meshed with the third rotating shaft 32 is arranged on the mounting plate 31, and three connecting rods which are rotationally connected to the third moving part 34 are rotationally connected to an eccentric position of the gear.

The structure of the first wheel set 1 is similar to that of the third wheel set 3, however, the axle direction of the first rotating wheel 13 when the first moving part 14 is fixed is mutually perpendicular to the axle direction of the third rotating wheel 33 when the third moving part 34 is fixed; when the first moving part 14 is fixed, the third moving part 34 is positioned in a linear motion state; and when the third moving part 34 is fixed, the first moving part 14 is positioned in a linear motion state.

The embodiment also includes a mode selection switch capable of switching the driving mode between the longitudinal driving mode and the transverse driving mode;

When the mode selection switch is selected as the longitudinal driving mode, the first rotating wheel 13 is switched into a directional state, the third rotating wheel 33 is switched into a follow-up universal state, and the axle direction of the second rotating wheel 24 is fixed at a position which coincides with or is parallel to the axle direction of the first rotating wheel 13 and is perpendicular to a length direction of fork;

When the mode selection switch is selected as the transverse driving mode, the third rotating wheel 33 is switched from a follow-up universal state to a directional state, the first rotating wheel 13 is switched from a directional state to a follow-up universal state, and the second rotating wheel 24 rotates by 90 degrees so as to allow the axle direction thereof is fixed at a position which coincides with or is parallel to the axle direction of the third rotating wheel 33 and is perpendicular to the length direction of fork.

Figure 14:
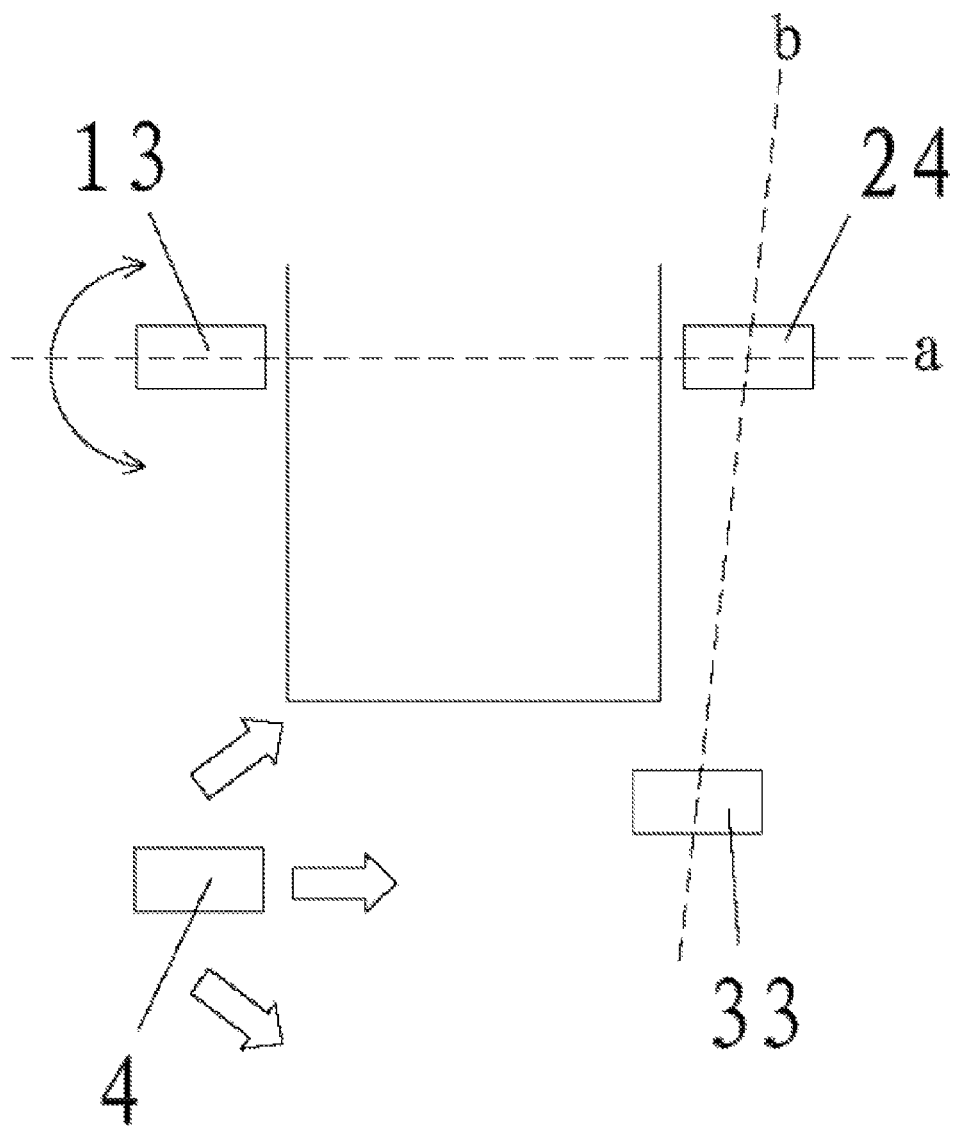
FIG. 14 shows the schematic diagram of rotating wheel distribution in the Embodiment 2.

Embodiment 2: the difference from Embodiment 1 is that the quadrangle formed by the four wheel sets is an irregular quadrangle. For example, as shown in FIG. 14, the connecting line 'a' of the first rotating wheel 13 and the second rotating wheel 24 and the connecting line 'b' of the second rotating wheel 24 and the third rotating wheel 33 are not perpendicular to each other.

Figure 15:
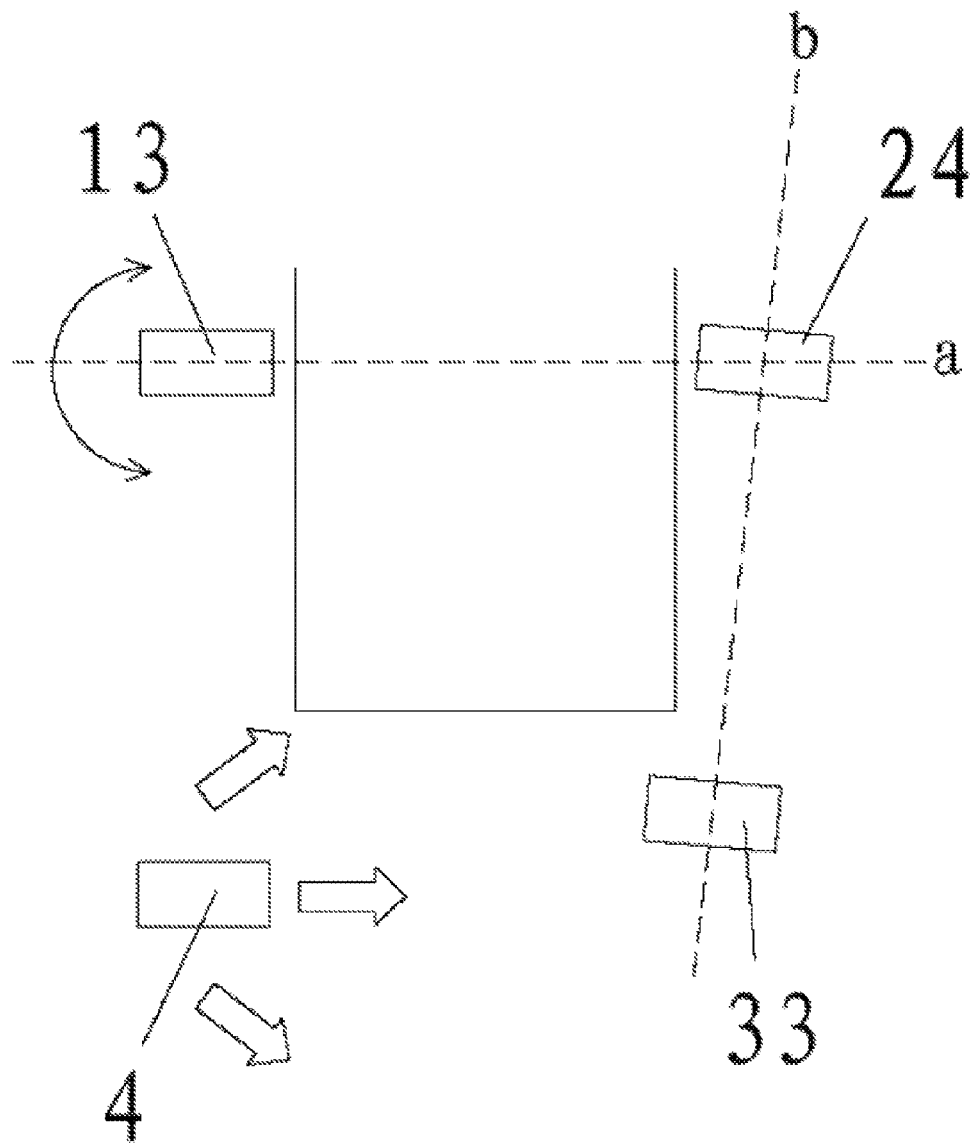
FIG. 15 shows the schematic diagram of rotating wheel distribution in the Embodiment 3.

Embodiment 3: the difference from Embodiment 1 is that the quadrangle formed by the four wheel sets is an irregular quadrangle. For example, as shown in FIG. 15, a connecting line 'a' of the first rotating wheel 13 and the second rotating wheel 24 and a connecting line 'b' of the second rotating wheel 24 and the third rotating wheel 33 are not perpendicular to each other; then, the axle of the third rotating wheel 33 coincides with the connecting line 'b'; and the driving mode is a longitudinal driving mode, the third rotating wheel 33 is switched into a directional state, an acute angle α formed between the axle of the third rotating wheel 33 and the length direction of fork is 5 degrees, under the condition, if the axle direction of the first rotating wheel 13 switched into the directional state is perpendicular to the length direction of fork, the rotating amplitude of the second rotating shaft 22 of the second rotating wheel 24 is 95 degrees; if an included angle formed between the axle direction of the first rotating wheel 13 switched into the directional state and the length direction of fork is 85 degrees, the rotating amplitude of the second rotating shaft 22 of the second rotating wheel 24 is 100 degrees; in a word, under the general condition, according to the variable-state wheel sets, an included angle formed between the axle direction of the rotating wheel in one variable-state wheel set switched into a directional state and the axle direction of the rotating wheel in the other variable-state wheel set switched into a directional state and a rotatable angle of the rotating shaft of the reversible directional wheel set are mutually supplementary angles.

Figure 16:
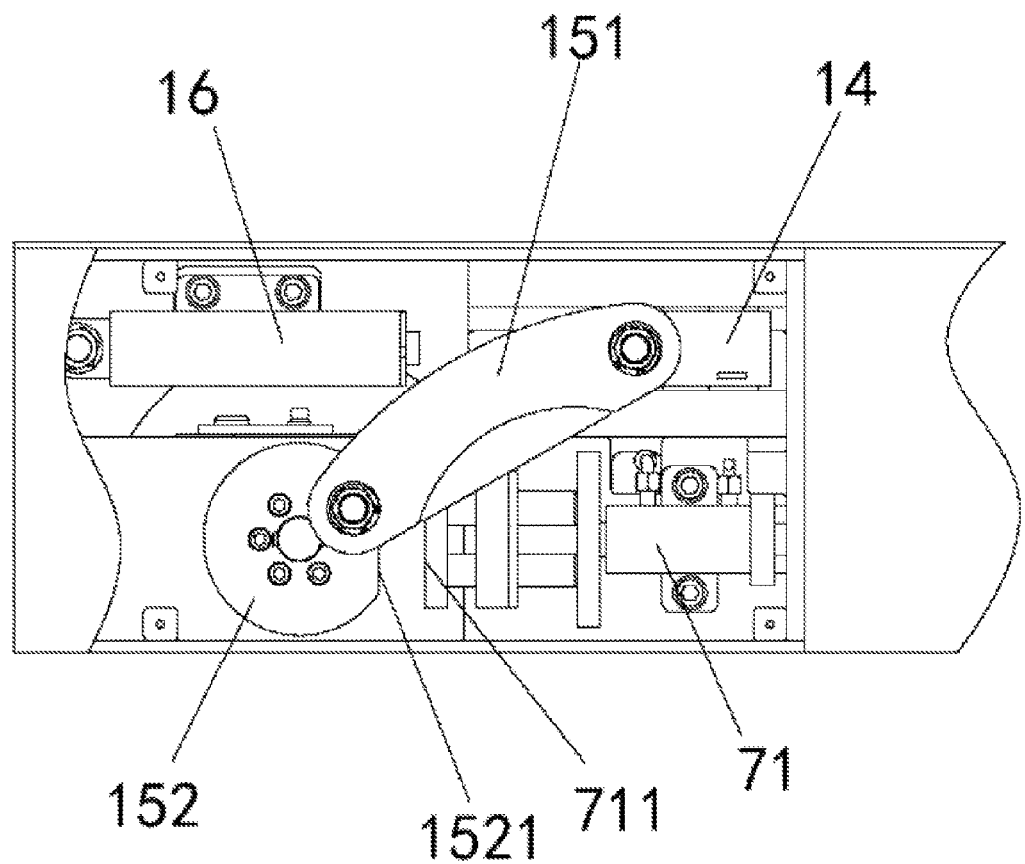
FIG. 16 shows the schematic diagram of a first wheel set in the Embodiment 5.

Embodiment 5: the difference from Embodiment 1 is that, as shown in FIG. 16, the first rotating arm 152 includes a working surface 1521; including a first auxiliary positioning piece 71, wherein the first auxiliary positioning piece 71 includes a pressing surface 711, and when the rotating wheel of the first wheel set 1 is switched into a directional state, the pressing surface 711 is pressed against and attached to the working surface 1521, so that the first rotating arm 152 is fixed; then, the force direction between the working surface 1521 and the pressing surface 711 is intersected on the axis of the first rotating shaft 12 fixed with the first rotating arm 152, so that the directional state of the first wheel set 1 is further stabilized.

The first auxiliary positioning piece 71 also can be a cylinder and other controllable telescopic pieces; when switched from a directional state to a follow-up universal state, the first auxiliary positioning piece 71 retracts so as to relieve pressing of the first rotating arm 152, and the first rotating arm 152 is switched into a follow-up universal state under the condition that the first positioning piece 16 does not actively move.

The structure of the embodiment is also applicable to the third wheel set 3.

Embodiment 6: the difference from Embodiment 1 is that, comprising five wheel sets arranged at the bottom of the vehicle body, wherein one wheel set is a steering wheel set 84 of which the structure is similar to that of a fourth wheel set in the embodiment 1; another wheel set is a reversible directional wheel set 81, the axle direction of the rotating wheel of the wheel set can be switched between two directions through the rotating action of the rotating shaft of the wheel set, and the structure of the wheel set is similar to that of the second wheel set in the embodiment 1; another wheel set is a universal wheel set 82; the other two are variable-state wheel sets, which are respectively a first variable-state wheel set 831 and a second variable-state wheel set 832, the rotating wheel state of each variable-state wheel set can be switched between a directional state and a follow-up universal state, and the structures of the two wheel sets are similar to those of the first wheel set and third wheel set in embodiment 1.

Figure 17:
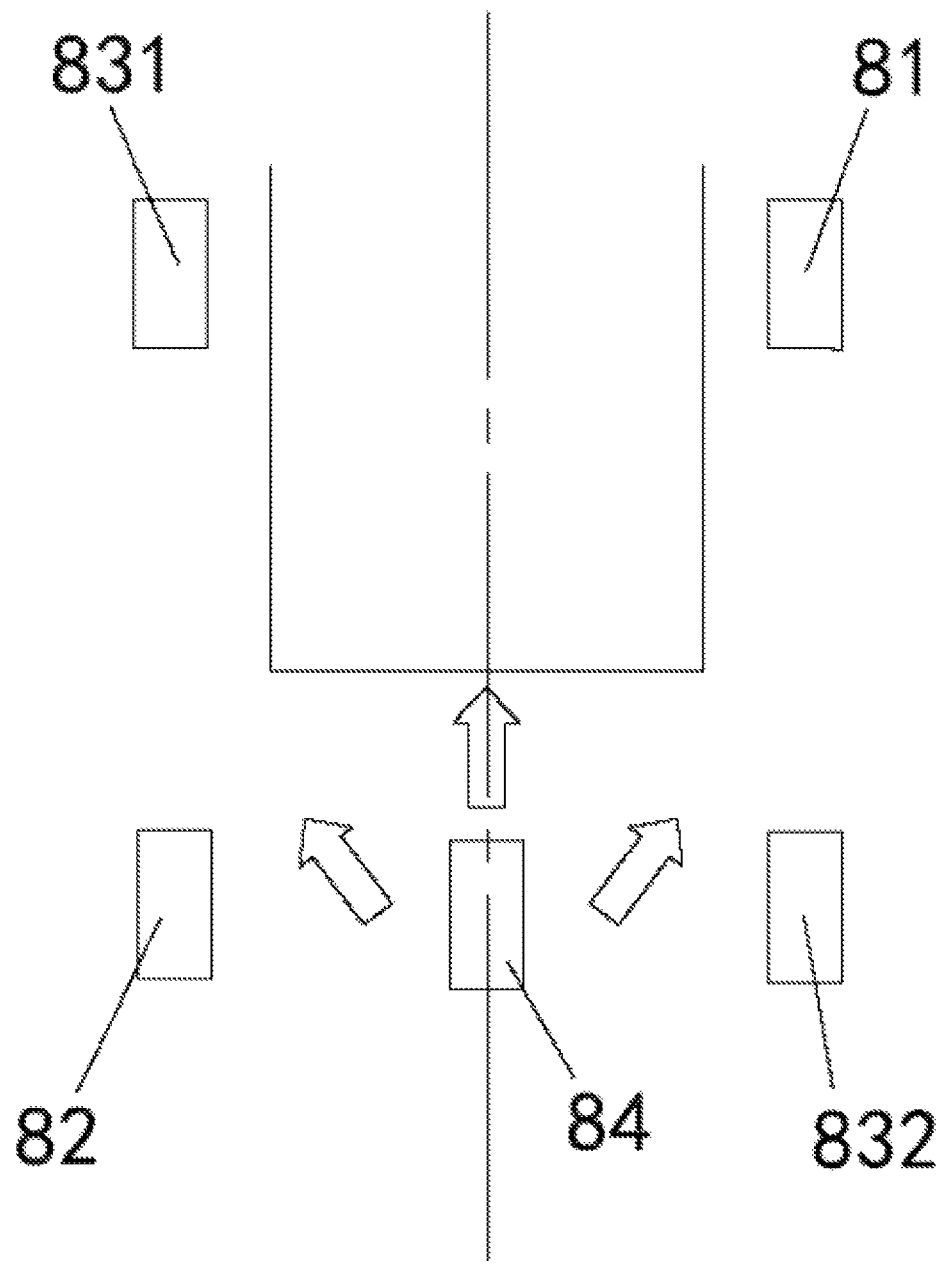
FIG. 17 shows the schematic diagram of wheel set distribution in the Embodiment 6.

As shown in FIG. 17, the reversible directional wheel set 81, the universal wheel set 82 and the two variable-state wheel sets 83 form a quadrangle, wherein the two variable-state wheel sets are positioned on one diagonal of the quadrangle, the reversible directional wheel set 81 and the universal wheel set 82 are positioned on the other diagonal of the quadrangle, and the steering wheel set 84 is positioned on a central axis of the industrial vehicle positioned between two forks.

The embodiment also can include a mode selection switch capable of switching the driving mode between the longitudinal driving mode and the transverse driving mode;

When the mode selection switch is selected as the longitudinal driving mode, the first variable-state wheel set 831 is switched into a directional state, the second variable-state wheel set 832 is switched into a follow-up universal state, and the axle direction of the rotating wheel of the reversible directional wheel set 81 is fixed at a position which coincides with or is parallel to the axle direction of the rotating wheel of the first variable-state wheel set 831 and is perpendicular to the length direction of fork;

When the mode selection switch is selected as the transverse driving mode, the second variable-state wheel set 832 is switched from a follow-up universal state to a directional state, the first variable-state wheel set 831 is switched from a directional state to a follow-up universal state, the rotating wheel of the reversible directional wheel set 81 rotates by 90 degrees so as to allow the axle direction of the rotating wheel to be fixed at a position which coincides with or is parallel to the axle direction of the rotating wheel of the second variable-state wheel set 832 and is parallel to the length direction of fork.

Embodiment 7: an industrial vehicle capable of driving in four directions, including any one of embodiments 1-3 and 5-6.

What is claimed is:

1. A traveling mechanism for an industrial vehicle capable of driving in four directions, comprising four wheel sets arranged at a bottom of a vehicle body which can be sequentially connected to form a quadrangle, wherein one wheel set is a steering wheel set, another wheel set is a reversible directional wheel set, and an axle direction of a rotating wheel of the reversible directional wheel set can be switched between two directions through a rotating action of a rotating shaft of the reversible directional wheel set; the other two wheel sets are variable-state wheel sets, and a rotating wheel of each variable-state wheel set can be switched between a directional state and a follow-up universal state;

wherein the steering wheel set and the reversible directional wheel set are positioned at a diagonal position of the quadrangle, and the two variable-state wheel sets are positioned at another diagonal position of the quadrangle.

2. The traveling mechanism for the industrial vehicle capable of driving in four directions according to claim 1, also comprising a mode selection switch capable of switching a driving mode between a longitudinal driving mode and a transverse driving mode;

when the mode selection switch is selected as the longitudinal driving mode, the rotating wheel in one wheel set in the two variable-state wheel sets adjacent to the steering wheel set is switched into a directional state, while the rotating wheel in the other wheel set of the two variable-state wheel sets is switched into a follow-up universal state; and moreover, the axle direction of the rotating wheel of the reversible directional wheel set diagonal to the steering wheel set is fixed at a position which coincides with or is parallel to an axle direction of the rotating wheel of the variable-state wheel set switched into the directional state;

and when the mode selection switch is selected as the transverse driving mode, the rotating wheel positioned in the follow-up universal state in the two variable-state wheel sets adjacent to the steering wheel set is switched into a directional state, another rotating wheel positioned in the directional state is switched into a follow-up universal state, and the rotating wheel in the reversible directional wheel set diagonal to the steering wheel set rotates so as to allow the axle direction of the rotating wheel of the reversible directional wheel set to be fixed at a position which coincides with or is parallel to the axle direction of the rotating wheel of the variable-state wheel set switched into the directional state.

3. The traveling mechanism for the industrial vehicle capable of driving in four directions according to claim 2, wherein each variable-state wheel set comprises a rotating shaft driving its rotating wheel to steer, and a limiting and positioning piece capable of locking and loosening the rotating shaft to rotate and move.

4. The traveling mechanism for the industrial vehicle capable of driving in four directions according to the claim 3, wherein the limiting and positioning piece comprises a moving part; a converting piece which is connected between the moving part and the rotating shaft and is used for converting a rotating motion of the rotating shaft around an axis thereof into a linear reciprocating motion of the moving part; and a positioning piece capable of fixing the moving part so as to limit the rotating motion of the rotating shaft.

5. The traveling mechanism for the industrial vehicle capable of driving in four directions according to the claim 4, wherein the converting piece comprises a linkage rod of which one end is rotationally connected to the moving part, and a rotating arm of which one end is fixedly connected to the rotating shaft and the other end is rotationally connected to the other end of the linkage rod; rotational connection of the rotating arm and the linkage rod is positioned on an axis deviating from the rotating shaft in a horizontal direction.

6. The traveling mechanism for the industrial vehicle capable of driving in four directions according to claim 5, wherein the rotating arm comprises a working surface; the limiting and positioning piece also comprises an auxiliary positioning piece; and when the rotating wheel in the variable-state wheel set is switched into a directional state, the auxiliary positioning piece comprises a pressing surface pressing on the working surface, so that the rotating arm is fixed.

7. An industrial vehicle, comprising the traveling mechanism according to claim 2.

8. The traveling mechanism for the industrial vehicle capable of driving in four directions according to claim 1, wherein each variable-state wheel set comprises a rotating shaft driving its rotating wheel to steer, and a limiting and positioning piece capable of locking and loosening the rotating shaft to rotate and move.

9. The traveling mechanism for the industrial vehicle capable of driving in four directions according to the claim 8, wherein the limiting and positioning piece comprises a moving part; a converting piece which is connected between the moving part and the rotating shaft and is used for converting a rotating motion of the rotating shaft around an axis thereof into a linear reciprocating motion of the moving part; and a positioning piece capable of fixing the moving part so as to limit the rotating motion of the rotating shaft.

10. The traveling mechanism for the industrial vehicle capable of driving in four directions according to the claim 9, wherein the converting piece comprises a linkage rod of which one end is rotationally connected to the moving part, and a rotating arm of which one end is fixedly connected to the rotating shaft and the other end is rotationally connected to the other end of the linkage rod; rotational connection of the rotating arm and the linkage rod is positioned on an axis deviating from the rotating shaft in a horizontal direction.

11. The traveling mechanism for the industrial vehicle capable of driving in four directions according to claim 10, wherein the rotating arm comprises a working surface; the limiting and positioning piece also comprises an auxiliary positioning piece; and when the rotating wheel in the variable-state wheel set is switched into a directional state, the auxiliary positioning piece comprises a pressing surface pressing on the working surface, so that the rotating arm is fixed.

12. An industrial vehicle, comprising the traveling mechanism according to claim 8.

13. An industrial vehicle, comprising the traveling mechanism according to claim 1.

14. An industrial vehicle, comprising the traveling mechanism according to claim 1.

15. A traveling mechanism for an industrial vehicle capable of driving in four directions, comprising five wheel sets arranged at a bottom of a vehicle body, wherein one wheel set is a steering wheel set; another wheel set is a reversible directional wheel set, and an axle direction of a rotating wheel of the reversible directional wheel set can be switched between two directions through a rotating action of a rotating shaft of the reversible directional wheel set; another wheel set is a universal wheel set; and the other two wheel sets are variable-state wheel sets, and a rotating wheel of each variable-state wheel set can be switched between a directional state and a follow-up universal state;

the reversible directional wheel set, the universal wheel set and the two variable-state wheel sets form a quadrangle, wherein the two variable-state wheel sets are positioned on one diagonal of the quadrangle, the reversible directional wheel set and the universal wheel set are positioned on another diagonal of the quadrangle, and the steering wheel set is positioned on a central axis of the industrial vehicle positioned between two forks.

\* \* \* \* \*